United States Patent [19]

Wilkinson

[11] 4,053,759
[45] Oct. 11, 1977

[54] LAMPHOUSE AND MODULE FOR PHOTOGRAPHIC SLIDE PROJECTORS

[75] Inventor: John Nicholas Wilkinson, Duarte, Calif.

[73] Assignee: Optical Radiation Corporation, Azusa, Calif.

[21] Appl. No.: 628,482

[22] Filed: Nov. 4, 1975

Related U.S. Application Data

[63] Continuation of Ser. No. 335,018, April 27, 1973, abandoned.

[51] Int. Cl.² .............................................. F21V 29/00
[52] U.S. Cl. ................................... 362/218; 240/41 R
[58] Field of Search ............ 240/41.35 R, 41 R, 41 B, 240/41.5, 47; 353/98, 54

[56] References Cited

U.S. PATENT DOCUMENTS

| | | | |
|---|---|---|---|
| 1,966,303 | 7/1934 | McFarlane | 355/68 |
| 3,639,751 | 2/1972 | Pichel | 240/47 |
| 3,703,635 | 11/1972 | Burkarth | 240/41.35 X |
| 3,720,822 | 3/1973 | Rochester et al. | 240/11.4 X |
| 3,766,377 | 10/1973 | Junginger | 240/47 X |

*Primary Examiner*—Edna M. O'Connor
*Attorney, Agent, or Firm*—John E. Wagner

[57] ABSTRACT

A high intensity lamphouse and cooling means for use with photographic slide projectors. The module has a protective glass face, and air inlet and a second air outlet on opposite diametrical points between the lamp and the glass face. Also included are an additional opening near the base of the lamp providing a second air path through the module along the rear side of a reflector and the length of the lamp.

5 Claims, 10 Drawing Figures

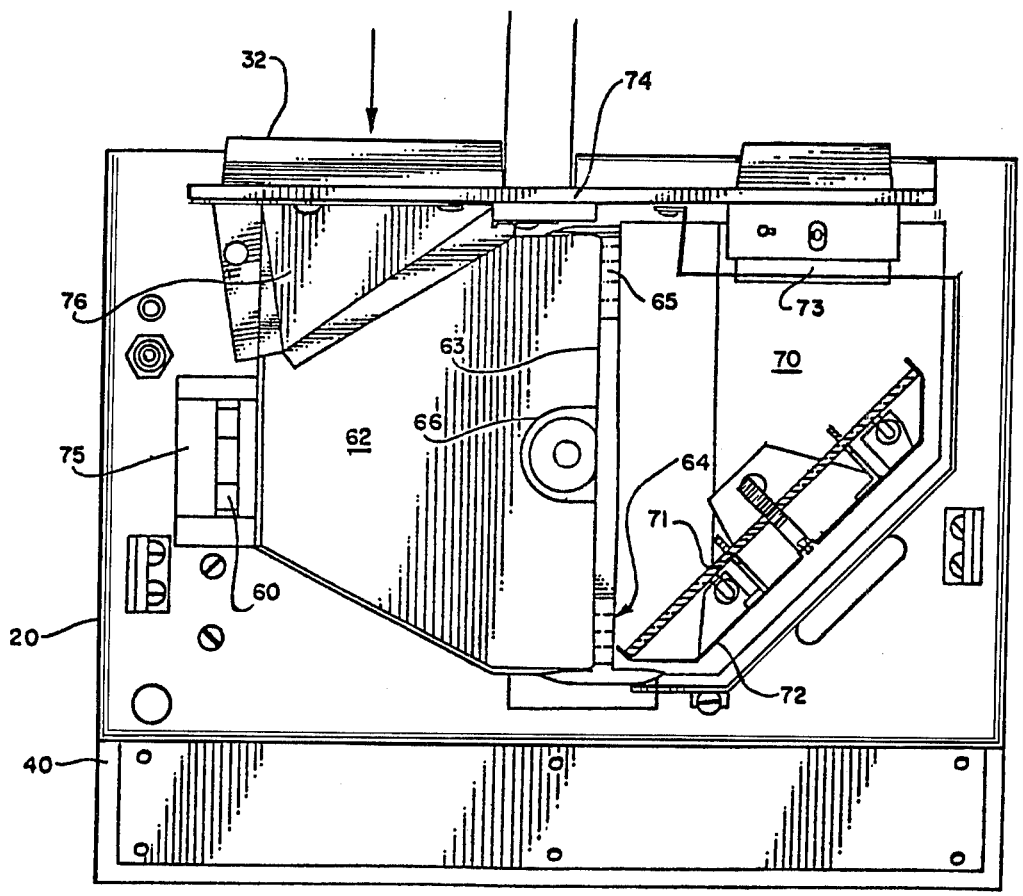
FIG. 6
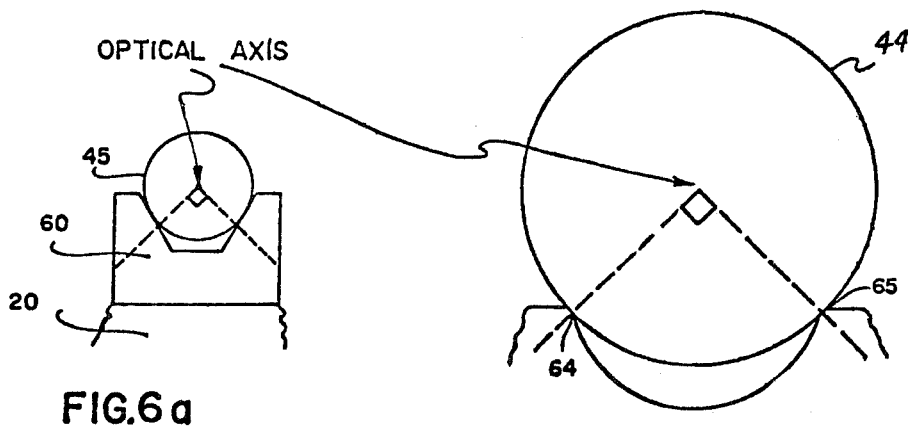
FIG. 6a
FIG. 6b

LAMPHOUSE AND MODULE FOR PHOTOGRAPHIC SLIDE PROJECTORS

REFERENCE TO RELATED APPLICATIONS

This is a continuation of U.S. application, Ser. No. 355,018, filed Apr. 27, 1973, now abandoned.

BACKGROUND OF THE INVENTION

For many years, photographic slide projectors have included a photographic slide handling mechanism, an optical system, a light source such as a tungsten filament lamp, a cooling fan and suitable controls for the lamp and slide changing mechanism. Such photographic slide projectors are commonly used for projecting 35 mm and 2 × 2 slides and are seriously light power limited for many applications. This limitation occurs because of the maximum light power which can be achieved from an internal tungsten filament lamp. Additionally, the photographic slide projector commonly displays a single transparency for 5 seconds to several minutes and despite light absorbing optics, there is a real danger of thermal damage to the photographic slide if a high intensity lamp is located in close proximity to the slide. Typically, a blower cooler has been included in such projectors to cool the lamp and the slide. Employing all of these approaches, the photographic slide projector is still capable of in the order 2,000 lumens output employing a conventional tungsten lamp with a total expected bulb life of in the order of 25 hours. With the power consumption and particularly short life of tungsten lamps, the operating costs of a typical configuration run in the order of $0.25 to $1.00 per hour.

High intensity lamp sources have heretofore been available for motion picture projectors and other applications where the lamps are installed, operated and serviced by professional personnel who are familiar with and able to take the necessary safety precautions with respect to the danger of lamp explosion in high pressure gas filled lamps. Since the photographic slide projector is more often used by amateurs or untrained individuals and youngsters of high school age, the use of high pressure gas filled lamps has not been possible. Such persons are not to be subjected to the risk of lamp explosion nor are they necessarily capable of focusing or positioning such lamps to obtain the optimum light output. Although high intensity gas filled lamps give a significantly greater light output than the tungsten lamp, they require enhanced cooling incompatible with existing slide projector housings.

Prior art patents disclosing various types of lamp assemblies are U.S. Pat. Nos. 3,639,751, 3,703,635, 3,720,822, and 3,766,377. U.S. Pat. No. 1,966,303 shows a light sensing mechanism.

BRIEF STATEMENT OF THE INVENTION

Based with the foregoing difficulties, I have invented a new slide projector lamp house employing a gas filled lamp. The lamp is contained within a protected module including a metal tubular body and a mirror and front window through which light is emitted. This window serves as protection in the event of lamp explosion. A mirror-Xenon arc combination of the type disclosed in my patent application Ser. No. 134,956, filed Apr. 19, 1971 and issued Mar. 13, 1973 as U.S. Pat. No. 3,720,460, is contained within the module maintaining the Xenon arc lamp positioned with its axis aligned with the axis of the mirror and the module. A housing assembly includes the support surface for a slide projector and a recess for a lamp module. The recess includes support points engaging reference surfaces on the module and defining a fixed axis for the module with respect to the optics of the slide projector. The recess also includes an electrical socket positioned to locate the module longitudinally with respect to the optical axis of the system. The housing includes a cover over the lamp module which includes openings and an exhaust fan positioned immediately above the lamp module.

The wall of the lamp module housing includes an opening communicating with the internal fan of the slide projector for directing air into a plenum below the lamp module and closed thereby. The plenum is pressurized by the fan of the projector and the plenum air is discharged through the module.

At least two inlets to the module are present and one outlet. One or two inlets are adjacent to the window and an additional inlet is located at the neck of the module. Two air paths through the module combine and exit through a common outlet.

The lamp module is generally frusto conical in shape with two tubular reference surfaces, one adjacent to the window and one constituting the throat of the module.

These surfaces cooperating with mating surfaces on the housing define the positioning of the module with the projector optics. The lamp is axially secured within the module by rigidly bonding the rear end of the lamp to the throat portion of the module after adjusting its alignment optically within the module. In one embodiment, the anode end of the lamp is adhesively bonded to the module. The mirror is cemented to the interior of the frusto conical portion of the module.

In another embodiment, the lamp is secured only by one end in the throat of the module and is cantilevered within the module. A running time meter powered by a photocell is incorporated within the module itself.

BRIEF DESCRIPTION OF THE DRAWINGS

This invention may be more clearly understood from the following detailed description and by reference to the drawings in which:

FIG. 6 is a fragmentary top view of the lamp house assembly with the cover and lamp removed;

FIGS. 6a and 6b are fragmentary side elevational views of the module support features of the assembly of FIG. 6;

DETAILED DESCRIPTION OF THE INVENTION

Figure 1:
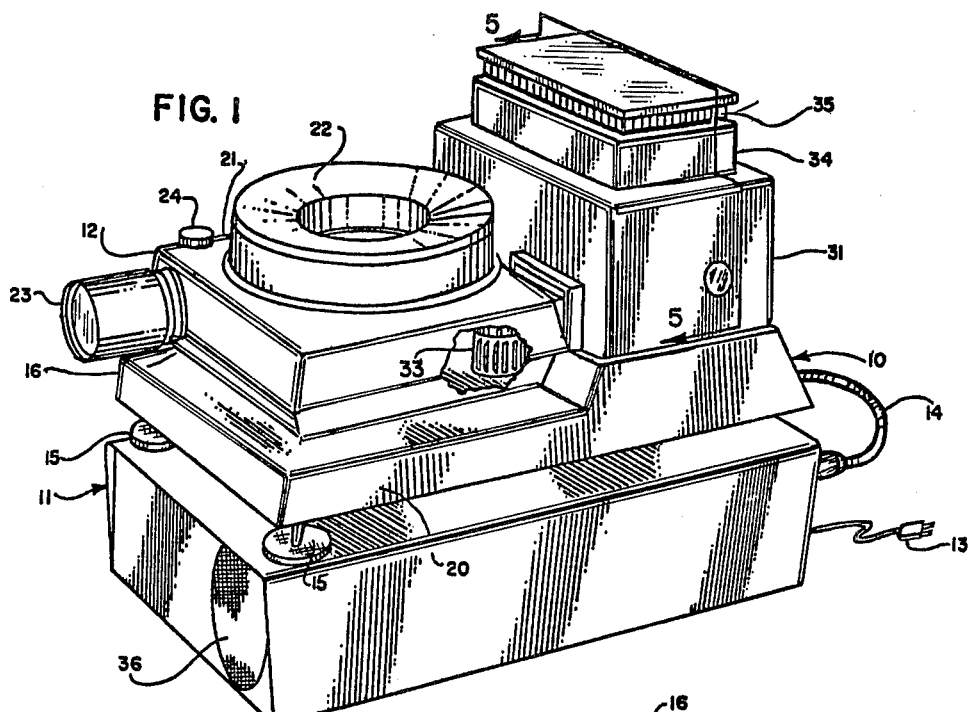
FIG. 1 is a perspective view of a projector lamp house and power supply in accordance with this invention with a conventional photographic slide projector resting thereon.
Figure 2:
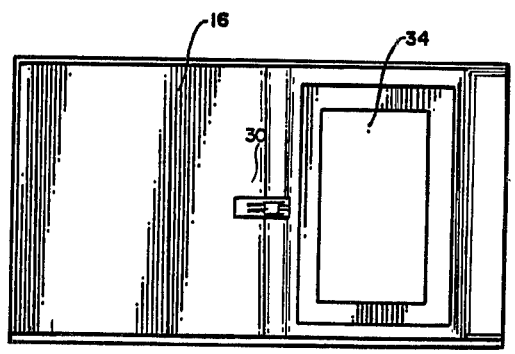
FIG. 2 is a top view of the slide projector lamp house of FIG. 1 with the slide projector removed.

Now referring to FIG. 1, a lamp house assembly 10 resting for convenience on its power supply 11 and supporting a photograhic slide projector 12 may be seen. The power supply 11 constitutes the base for the entire combination or it may be located separately and connected to the power mains by a conventional line plug 13 and in turn is connected to the lamp house assembly 10 via power cable 14 through which the operating power for the lamp house assembly and the projector is supplied. The lamp house assembly 10 rests on the top surface of the power supply supported by three adjustable feet 15, two of which appear in FIG. 1. Similarly, the feet of the projector 12 unshown in the drawing, rest in mating recesses in the platform portion of lamp house assembly 10.

The projector illustrated in the drawing, and one which is particularly suitable for use in connection with this lamp house assembly, is the Ektagraphic Model AV433 produced by the Eastman Kodak Company of Rochester, N.Y., but other slide projectors may similarly be used with this lamp house. Whichever slide projector is used rests upon the platform 16 and the internal lamp if necessary, is removed through a rear opening so that illumination from the lamp house 10 may be introduced into the projector at the rear aligned with its optics.

In this particular application, the projector illustrated includes a body portion 21 mounting a carousel type slide tray 22 and includes an internal slide changing mechanism. At the front of the lamp house is the lens assembly 23 controlled through focus knob 24.

Figure 4:
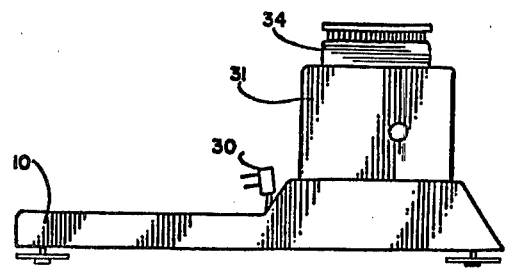
FIG. 4 is a side view of the lamp house assembly of this invention.

The slide projector 12, in addition to its resting contact with the lamp house assembly and the optical path through the right rear portion of the projector body 21 includes electrical connection therewith illustrated in FIG. 4, namely, an electrical connector 30, and includes an air supply connection with the lamp house main frame 10. This air supply connection is via a rectangular inlet 32 (FIG. 6) which joins a rear opening in the projector (unshown) through which air flow, produced by the fan internal to the projector, enters the housing 31 of the lamp house 10. Other than the removal of the principal illumination of the projector where required, the projector 12 is unmodified.

Figure 3:
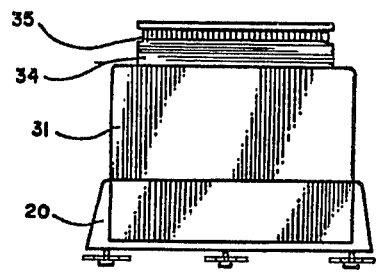
FIG. 3 is a rear view of the lamp house assembly of this invention with the control panel showing.

The lamphouse 10 is rigidly positioned on the base 20 employing the adjustable feet 15 as illustrated in FIGS. 1 and 3. A precise adjustment in vertical elevation of the projector and lamp house assembly 10 may be easily accomplished from the rear of the lamp house assembly 10. Although the entire assembly presents equipment of some size, the projector, with its integral handle, the lamp house and the power supply are each separate and may be transported separately, each well within the load carrying capacity of an individual. The heaviest elements of the system, namely the lamp house and power supply, each weigh in the order of 30 pounds.

The base portion 16 of the lamp house 10 contains a basic high voltage supply used in the lamp house and provides a rigid support for a Xenon lamp module contained within the rear portion of the base 16 and enclosed within the cover 31. At the top of the cover is a tower 34 including a number of vent openings 35. A rear control panel mounts timing and control electronics. The tower 34 encloses a fan designed to draw air from the housing 31 in the manner which is described in more detail in connection with FIGS. 5 and 6. Here, suffice it to say, the tower 34 includes a fan and vents 35 for exit of air. The power supply 11 also employs an internal cooling fan which exhausts through vent opening 36 at the front end thereof.

Employing the lamp house of this invention with a Xenon arc lamp of approximately 500 watts rating, it is possible to project up to 16 foot lamberts on a 20 foot screen resulting from 4,000 lumens at the slide aperture operating from a conventional 115 volt AC power source drawing approximately 10 amperes. The light output of the system employing this invention is approximately 6 times greater than conventional 500 watt tungsten lamp projectors and over twice as bright as newer advanced high intensity metal arc lamp systems. The light source also approaches daylight in color quality at a temperature of 5,400° K.

Each of these advantages are accomplished principally by the use of a Xenon gas filled lamp and the mirror combination disclosed in my above referenced patent, and positioned and cooled in accordance with this invention. The positioning and cooling features may be more clearly seen in FIGS. 5 and 6 to which reference is now made.

Figure 5:
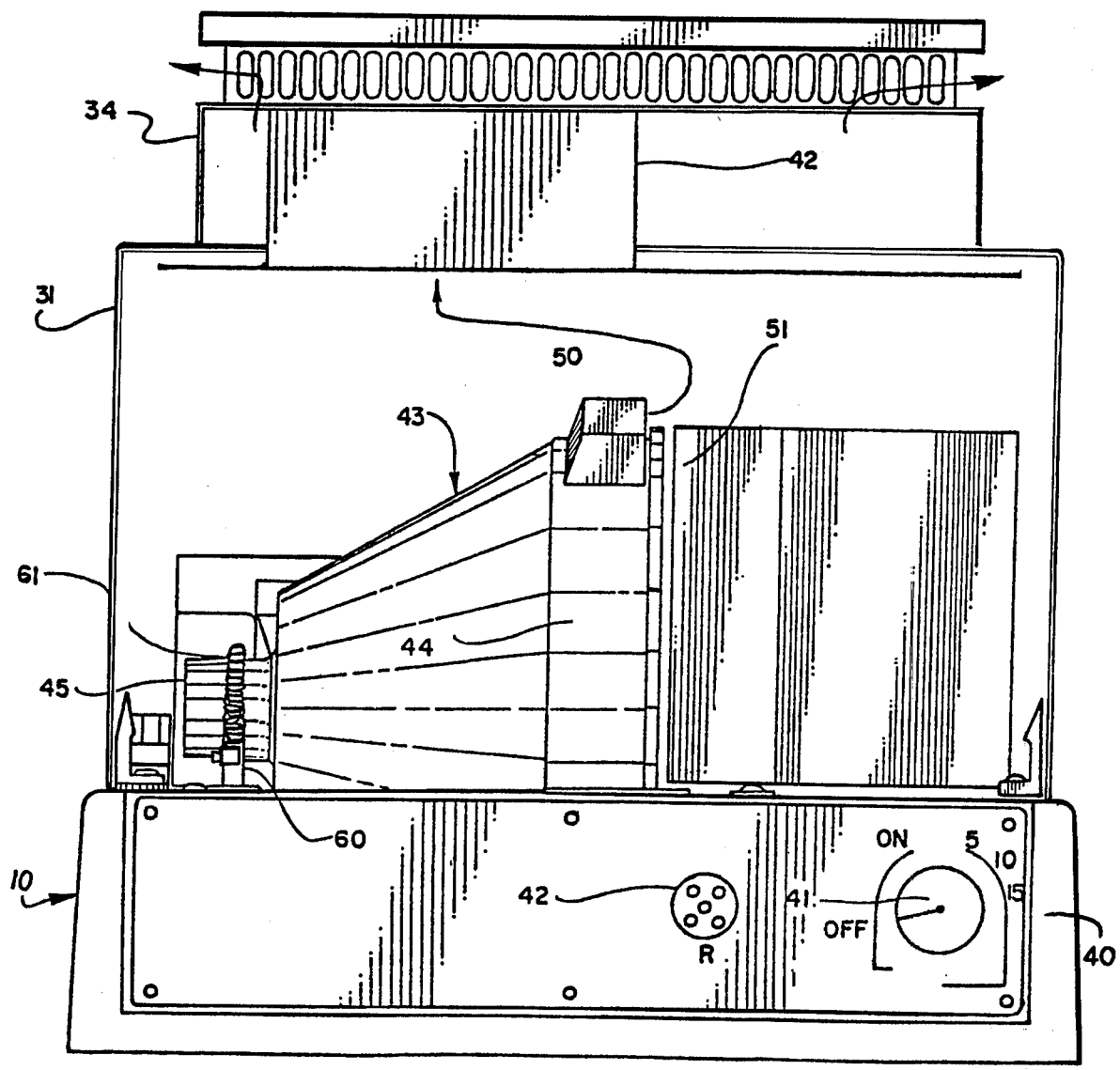
FIG. 5 is a rear view partly in section of a lamp house assembly of FIGS. 1-4.

FIG. 5 shows the lamp house 10 from the rear with the cover 31 and tower 34 in section along the lines 5—5 of FIG. 1. The rear of the lamp house 10 includes a control deck 40 extending at an incline for ease of operation and having a single operating control thereon, namely, knob 41. This knob typically controls a six position selector switch including the positions off, fan, on, 5, 10 and 15. In the off position, no power is supplied to either the lamp house or the projector. When moved to the fan position, both a cooling fan of the lamp house shown in FIG. 5 as a cylindrical shape axial flow type 42 and the projector slide mechanism are energized initiating the flow of cooling air. With the selector knob 41 turned to on, the lamp house is energized. The remainder of the positions identified as 5, 10 and 15, control an automatic timer for initiating automatic operation of the slide change mechanism at intervals of 5, 10 or 15 seconds. These constitute the normal controls for the slide projector and may be operated by an operator positioned at the rear of the lamp house assembly. As is often the case, it is desirable that the operator, who may be on a stage or other location, would like to control the advance, return and change the slides from some other location. Slide projector 12 of FIG. 1 includes such a remote control, and such a control is continued to be available through the remote plug R at the rear of the lamp house 10. Merely plugging in the remote plug R of the lamp house transfers this function.

With the cover 31 shown in section, another inventive aspect of the lamp house may be seen for the first time. It constitutes the lamp module 43 which is partly nested within the base 20 and is of a generally frusto conical shape with a front cylindrical portion 44 and a cylindrical neck portion 45 at the rear. The module 43 includes a front lip region 46 which holds a safety glass window. Additionally a number of air vents and shields are located about the front lip, one of which, exhaust outlet 50 appears in FIG. 5. The module 43 as shown in FIG. 5 is primarily a unitary metal casing with the rear end sealed as later described and the front end closed by a glass window. Contained within this module is a Xenon gas filled lamp better seen in FIGS. 7 and 8. Suffice it to say that the lamp and its associated mirror appearing on FIG. 8, contained within the module 43 is aligned with the axis defined by the two surfaces 44 and 45 and directed through the window and towards a planar mirror positioned within a shield 51 and directed to the lamp house's own negative lens 73 which may be seen in FIG. 6.

The lamp module (FIG. 5) 43 encloses a Xenon gas filled lamp with one end secured to the throat portion 45 and the other extending toward the front window. Thus the lamp is positioned with its axis horizontal. As can be determined from my previous patent, the positioning of the lamp with its axis horizontal and its precise positioning of one electrode with respect to the first focus of an aspheric reflector produces substantially uniform image at the second focus. This image is then transferred by means of a negative lens appearing in FIG. 6 located between the second focus and the mirror 51. The negative lens forms a virtual image of the uniform spot between the negative lens and the mirror. A condenser lens within the projector then forms a real image of the uniform spot at the slide plane within the acceptance angle of the projection lens.

The module 43 has two reference surfaces, namely, the cylindrical throat portion 45 and the large cylindrical portion 44. In assembly of the module as discussed later in this specification, the module is coaxial with the lamp. It is therefore possible to position the lamp and mirror precisely with respect to the optics of the lamp house and the optics of the projector merely by placing the module 43 in its designed position in the base 20. One of the references for positioning the module 43 comprises a metallic saddle 60 including a pair of surfaces which precisely position the neck or throat portion 45 of the module 43. A retainer spring 61 maintains the throat of the module 43 in place in the saddle 60. This saddle 60 is better seen in FIGS. 6 and 6a showing the base 20 with a well portion or plenum 62 into which the lamp module extends. At the bottom front of the well portion 62 is a cylindrical concave wall 63 including a pair of spaced reference surfaces 64 and 65 which mate with the surface 44 of the bulb module and with the saddle 60, define the precise positioning of the module 43. Saddle 60 mates with surface 45 of the module 43. Contained within the well 62 is a high voltage terminal 66 used to apply the starting voltage to the lamp and to provide a longitudinal reference for the module 43.

A second well 70 is present in the base 10 on the opposite side of wall 63. In that wall is a 45° positioned mirror 71 on an adjustable mirror mount 72. The mirror 71 is designed to cooperate with the lamp module 43 of FIG. 5 and direct its beam towards a negative lens 73 positioned in the side wall 74 which is attached to the base 20. The reference surfaces 64 and 65 are likewise integral with the base providing a definite rigid optical system. The saddle 60 is positioned on a surface ground 75 planar for reference to the optical axis in a vertical direction. Attachment holes for saddle 60 are located in a horizontal plane for reference to the optical axis of the system and referenced with respect to the surface 64 and 65 and the mounting hole of lens 73. The saddle 60 is slightly adjustable in the alignment of the module during manufacture.

The feature of this invention for positioning the module 43 is best illustrated in FIGS. 6a and 6b. FIG. 6a shows the saddle 60 mounted on its reference surface 16. Saddle 6a includes a semi V slot having a pair of angular planar surfaces which acts as tangents to the neck portion 45 of the module 43. Preferably, the surfaces are normal to and passing through the optical axis of the module. A spring 61 shown in FIG. 5 and unshown in FIG. 6a biases the neck 45 against the two surfaces and accurately positions the neck of the module 43.

The cylindrical surface 44 of the module 43 as seen in FIG. 6b similar to the neck 45, bears against a pair of generally planar tangential surfaces 64 and 65. The module is thus rigidly mounted with respect to the base. It should be noted that the optical axis of the lamp module of FIG. 6b is aligned with the axis as it passes through the neck portion 45. Interchange of lamps is accomplished merely by module exchange and each succeeding module rests on the same reference surfaces whereby the optical axis of each new lamp is automatically superimposed on the axis of the system without the need for any adjustment.

There is one additional entrance to the well 62. It is an air inlet through the rectangular opening 32 in wall 74 under deflector cover 76. Air from the blower of the projector enters through inlet 32, second, passes through a collector passage in cover 76 into the well 62 as denoted by the arrows. The path of the cooling air from well 62 is through the lamp module 43 of FIG. 5 since flow is obstructed on all sides by the walls of the well including the front wall 63. There is a slight amount of clearance between the wall 63 and the lamp module when in position and this is filled with rubber gaskets 77 to minimize air leakage.

As indicated above in connection with FIGS. 1 and 5, an additional blower or exhaust fan 42 is positioned above the lamp module to extract heated air from the housing 31. Thus, air enters the bottom of well 62 due to a positive pressure of the blower of the projector and is extracted by the exhaust action of the fan 42. These two fans cooperate to provide a constant and uniform flow through the lamp housing 31.

Not only is the air flow through the housing but incorporating another feature of this invention, the air flow is caused to flow through the lamp module in a manner which cools both ends as well as the envelope of the lamp. This feature may be seen in FIGS. 7 and 8.

Figure 7:
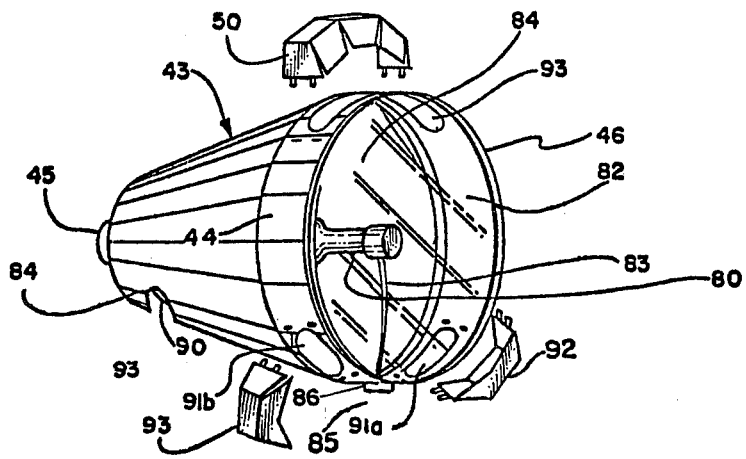
FIG. 7 is a perspective view of a lamp module employed in this invention with parts exploded for clarity.

Now referring to FIG. 7 disclosing lamp module 43 as it is normally handled by the user of the projection system whenever lamp exchange is required. Lamp module 43 may be seen to include the internal lamp 80 within one embodyment, its outer end 81 butting directly against the front window 82 of the module 43. The front end of lamp 80 is electrically connected to the exterior via a pigtail lead 83 and plug connector 85, the latter of which extends through insulator 86 to directly below the ring portion 44 of the module. The lamp 80 may be seen as extending rearward axially within the module 43. Also appearing in FIGS. 7 is the aspheric reflector 84 of the design disclosed in my patent referenced above. Thus the lamp module 43 with its internal lamp 80 and collector or mirror 84 constitutes an entire optical assembly and one which need not be focused or adjusted in any manner by the user or operator. It merely has to be placed in a position shown in FIG. 5 with the cylindrical surfaces 44 and 45 bearing on their mating references saddle 60 and surfaces 64 and 65. Thus optically the alignment and positioning of the light source is precisely obtained without any skill on the part of the operator. Likewise, the lamp which contains high pressure gas and being subject to explosion upon mishandling, is completely protected from such occurance since user never touches the lamp. The window 82 is bonded to the lip 46 by a resilient cement such that in the event of excess pressure within the lamp housing upon explosion, the window 82 tends to respond as a unit outward to the pressure increase or in a worse case, to be blown slightly outward in a single piece without injury to anyone. Baffles 50, 92 and 93 cover their respective openings so that no part of the lamp is exposed to direct unprotected view.

It must be recognized that in providing protection and ease of installation of the lamp as is illustrated in FIG. 7 and at the same time providing adequate cooling for the lamp, can present a serious problem. This is eliminated however and efficient cooling takes place through the coordinated design of the cooling system. This involves an opening 90 toward the rear of the frusto conical portion of the module 43 extending into the region behind the mirror 84, portion of which may be seen through the opening 90. As may be seen in FIG. 8, the mirror 84 encircles the lamp 80 but has an opening in the rear portion larger in diameter than the bulb extending through the openings and is spaced therefrom. Air entering the opening 90 in the module 43 may enter the main body of the lamp module surrounding the base of the lamp 80 forcing flow over one end of the lamp and bulb. A second pair of openings 91a and 91b, one of which 91a appears in the drawing, are placed on opposite sides of the high voltage terminal 86. These openings are covered by shields 92 and 93 which serve to direct air into the module 43 and at the same time protect the lamp from direct view through the otherwise unprotected opening. In the event of lamp explosion, there is no direct route for glass particles out of the module 43.

Figure 8:
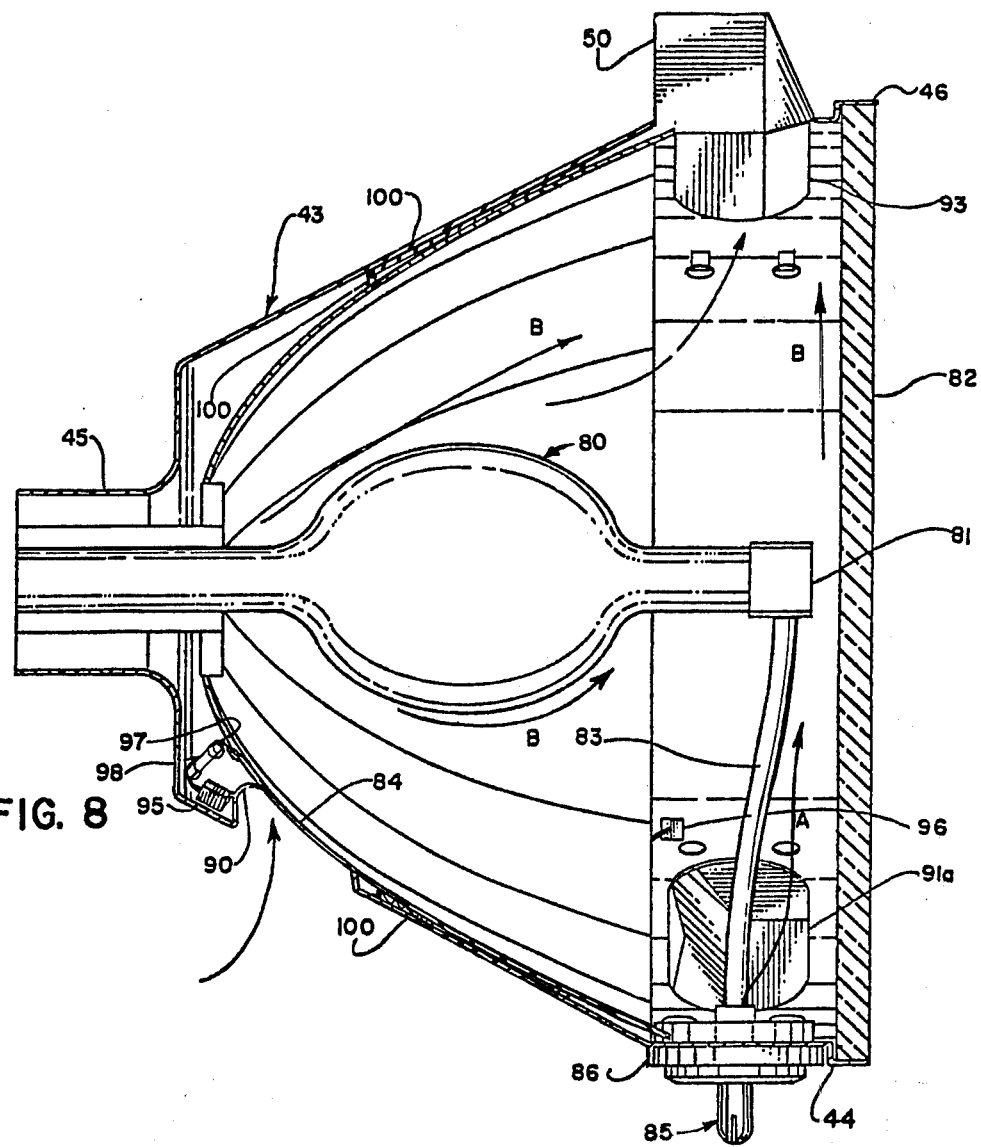
FIG. 8 is a vertical sectional view through the lamp module of FIG. 7.

An additional opening in the lamp module 43, namely the single air outlet opening 93 is positioned at the top in the cylindrical portion 44 just inside the glass window 82. The opening 93 is protected by shield 50 similar to the shields 92 and 93. The area of the opening 93 approximates that total of the openings 90, 91a and 91b. The fact that the two inlet openings 91a and 91b and one exit opening are placed on opposite edges of the interior of the glass window 82, provides a relatively uniform flow of air across the front end of lamp 80 at all times. This tends to extract thermal energy from the lamp which otherwise would cause the lamp to overheat and function improperly. FIG. 8 shows this flow as represented by arrows A. At the same time, air entering the opening 90 represented by reference letter B flows along the rear surface of the mirror 84 and through the annular opening between the mirror 84 and lamp 80 and along the length of lamp 80 and thence exit through the opening 90. This dual path insures superior cooling of the lamp 80 despite explosion tight construction of module 43.

The module 43, as shown in FIG. 8, also contains a unique monitoring system which indicates the operating history of the lamp 80. The system is comprised of the lamp 80, a photo-voltaic cell 96 and an elapsed time indicator 95. The system functions whenever the lamp 80 is emitting light. The photo-voltaic cell 96 converts light energy incident to its surfaces into electrical energy which in turn drives the elapsed time meter 95. The time meter 95 is calibrated to the desired scale by installation of a series resistor in the photocell time meter circuit. The photo-voltaic cell 96 is preferably a silicon solar cell secured in the front joint region between the mirror 84 and the module body with a portion extending outward in view of the lamp 80. The photo-voltaic cell 96 is connected by a pair of leads 97 through a calibrating resistor 98 to the elapsed time meter 95. The latter is preferably a microcoulometer, type 120 pc produced by Curtis Industries, Inc. of Mount Kisco, N.Y. It similarly is bonded to the module in position to be viewed through opening 90. Thus the lamp and its own running time meter are self contained within a protected module which also is air cooled.

The module 43 as shown in FIGS. 7 and 8 also is manufactured employing a novel method of assembly. This method results in rigid fixed coaxial relationship between the lamp 80 and its associated mirror 84 and the module 43 employing flexible mounting adhesives which seem to present an anomaly. However, experience has shown that the lamp modules can be effectively assembled, tested, handled, installed, replaced and the alignment of the lamp 80 and its reflector 84 remain fixed. The module may also be relamped at the factory in a very simple manner.

Initial assembly is achieved using the two reference surfaces 43 and 45 as the references in assembly as well as in use. Given the empty module shell which is of spun metal, the reflector 84 is positioned within the frusto conical portion by a band of adhesive 100 on the central portion of the wall.

The innermost walls of the mirror are aligned with the interior of the throat portion 45 and the adhesive 100 is allowed to assume a semi-hard condition. Preferred adhesive for use is known as RTV manufactured by the General Electric Corporation of New York, N.Y. Thereafter, the pigtail lead 83 of lamp 80 is inserted in the reflector 84. The window 82 is then secured to the lip 46 by silicone rubber cement. The base of lamp 80 extends into the throat portion 45 and is loosely positioned therein. Next the lamp is aligned on the optical axis with an actual projector and the neck of the lamp bonded by ceramic cement to the module body 45.

The above described embodiments of this invention are merely descriptive of the principles and are not to be considered limiting. The scope of this invention instead shall be determined from the scope of the following claims, including their equivalents.

What is claimed is:

1. A high-intensity lamp module, comprising:
an elongated high-intensity lamp having a central illumination portion and a pair of oppositely-disposed terminal portions thereon;
a housing surrounding said lamp, said housing having two opposed ends, one of which includes means for mounting said elongated lamp by one of said terminal portions and the other of which includes means for mounting a light-transmitting window;
a light-transmitting window mounted in said other end of said housing;
a reflector mounted within said housing for reflecting light from said high-intensity lamp out of said housing through said light-transmitting window, said reflector surrounding said lamp but being spaced therefrom to permit cooling fluid within said housing to pass between said lamp and said reflector;
a first opening in said housing adjacent the inner face of said light-transmitting window and serving as a port of egress for cooling fluid introduced into said housing;
a second opening in said housing adjacent the inner face of said light-transmitting window at a position substantially opposite to that of said first opening and serving as a port of ingress for cooling fluid introduced into said housing, the flow of cooling fluid from said second opening to said first opening being substantially adjacent such inner face of said window and including the adjacent one of said lamp terminal portions; and a third opening in said housing substantially adjacent the end of said housing serving as a mounting means for said lamp, the flow of cooling fluid from said third opening to said first opening passing between said reflector and said lamp in direct contact with the latter;

whereby two separate and distinct paths of flow are provided for cooling fluid introduced into said housing, the two paths becoming one at the point of egress at said first opening in said housing.

2. The combination in accordance with claim 1 wherein said housing includes a cylindrical section constituting the opposed end mounting said window and includes a frusto conical section, said first opening being in the wall of said frusto conical section adjacent to the space between said lamp and reflector; and said second and third openings being in said cylindrical section.

3. The combination in accordance with claim 1 including shield means secured to said housing over each of said first, second and third openings;

said shield means being dimensioned to prevent direct view of said lamp through each respective housing opening.

4. The combination in accordance with claim 1 wherein said housing includes a frusto conical section extending in the region between said two opposed ends;

said opposed ends being cylindrical and coaxial with said frusto conical section; and said cylindrical ends constituting mounting surfaces and optical references for said housing.

5. The combination in accordance with claim 1 including electrical terminal means conductively connected to the other of said pair of oppositely disposed terminal portions of said lamp;

said electrical terminal means extending out of said housing between said opposed ends; and said electrical terminal constituting a longitudinal alignment reference for said housing.

* * * * *